March 23, 1937.　　W. P. PORTER　　2,074,487
VALVE AND VALVE GEAR FOR INTERNAL COMBUSTION ENGINES
Filed May 25, 1934　　2 Sheets-Sheet 1

INVENTOR
Winfield P. Porter
BY
Prindle Bean & Mann
ATTORNEYS

March 23, 1937. W. P. PORTER 2,074,487
VALVE AND VALVE GEAR FOR INTERNAL COMBUSTION ENGINES
Filed May 25, 1934 2 Sheets-Sheet 2
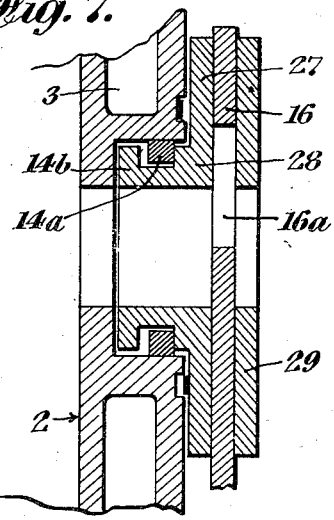
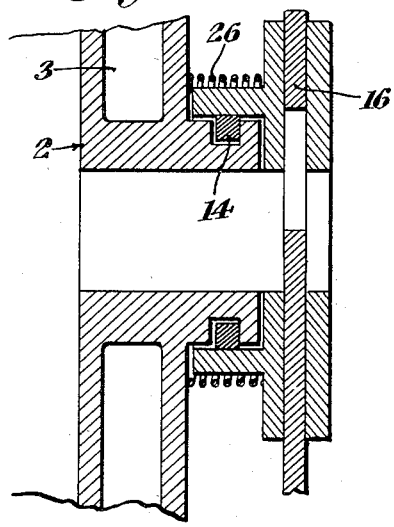
INVENTOR
Winfield P. Porter
BY
Prindle, Bean & Mann
ATTORNEYS / Patented Mar. 23, 1937

2,074,487

UNITED STATES PATENT OFFICE 2,074,487

VALVE AND VALVE GEAR FOR INTERNAL COMBUSTION ENGINES

Winfield P. Porter, Greene, Maine

Application May 25, 1934, Serial No. 727,408

1 Claim. (Cl. 123—188)

The object of my invention has been to provide a valve and valve gear for internal combustion engines, and particularly those of motor cars, which, among other advantages, shall have those of preventing the escape of the hot gases while the valve is closed, and also to a large extent of preventing undue intake of lubricating oil around the piston ring on the suction stroke of the piston and to such ends my invention consists in the valve and valve gear for internal combustion engines hereinafter specified.

In the accompanying drawings, Figs. 1 and 2 are respectively a vertical cross-sectional view taken in a plane transverse to the line of cylinders, of a slidable valve consisting of a flat plate, and a front elevation of a valve mechanism; and a vertical elevation in part of an explosive engine.

Figure 3:
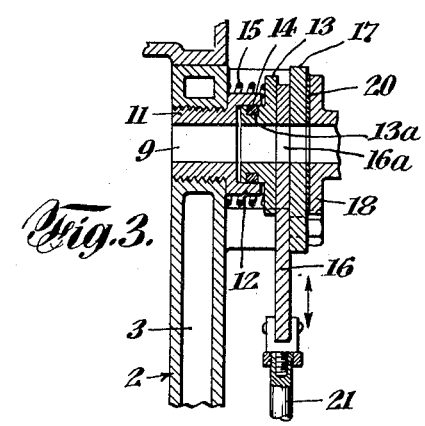
Fig. 3 is an enlarged, vertical, cross-sectional view of the valve, port and adjacent parts of the frame and cylinder of the engine shown in Figs. 1 and 2.
Figure 5:
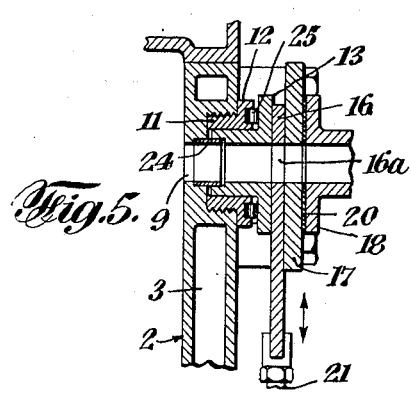
Figure 6:
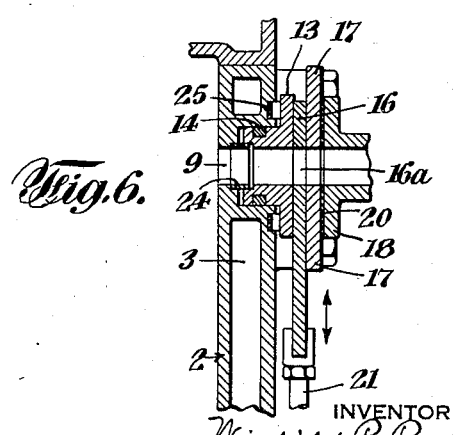

Figs. 5 and 6 are views similar to Fig. 3, but showing still other variations in details, and Figs. 7 and 8 are horizontal cross sectional views, much enlarged, of forms of my valve mechanism and the adjacent portion of the cylinder, Fig. 7 showing the groove, that carries the split ring, in the outer cylindrical surface of the cylindrical hub or part, and using the annular crimped spring; while, in Fig. 8, a spiral spring is used instead of the crimped spring.

Figure 1:
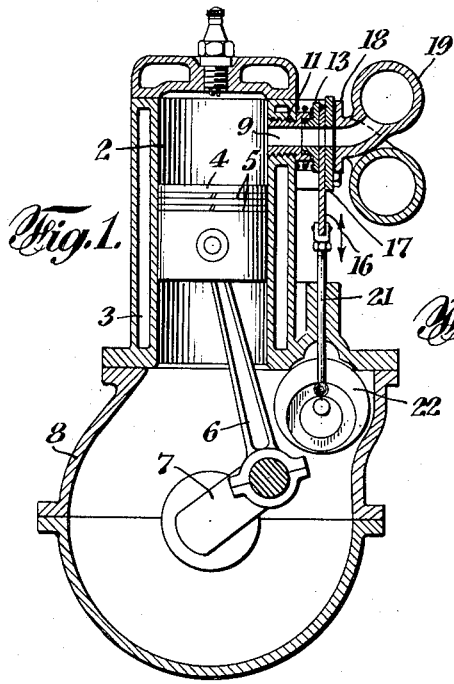
Figure 2:
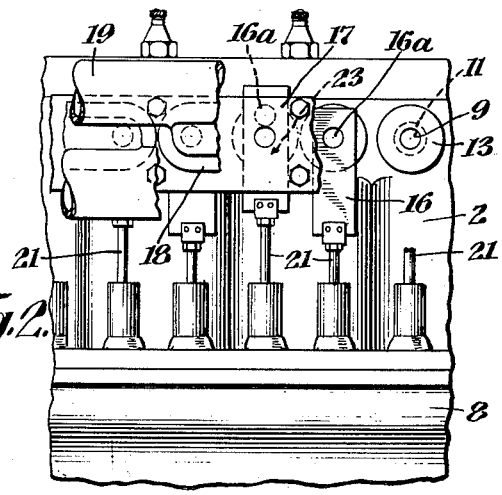

In the form of my invention shown in Figs. 1 and 2, the cylinder 2 having the usual water compartments 3 and containing piston 4, having split piston rings 5 connected by the connecting rods 6 to the crank shaft 7 that is located in the crank case 8, are designed in the usual manner.

An opening or passage 9 extends from the compression chamber in the upper part of the cylinder wall, through the said wall, the mouth or outer end of which passage is preferably rectangular in form. The said opening or port has a bushing 11 therein, the outer cylindrical end 12 or flange of which is enlarged to receive the smaller hub or cylindrical end of a flanged sleeve 13, said smaller end or hub carrying in a groove 13a, formed in the outer surface thereof, a metal split piston ring 14, said sleeve 13 being movable along the line of its axis, the relation of the said ring, and the said sleeve to that of the said enlarged cylindrical end of the bushing 12 being that of a piston ring to a piston in a cylinder.

A spiral compression spring 15 surrounds the said enlarged outer end of the bushing 12, and presses against the cylinder wall in one direction and in the other against the flange of the said movable sleeve 13, thus forcing said flange against the sliding plate 16, constituting the valve proper, which in turn is thus pressed against the fixed plate 17, that is bolted to the flange 18 of the exhaust pipe 19, a gasket 20 making the joint tight.

The sliding plate 16, having a port 16a therein, is moved up and down by a rod 21 having an eccentric strap at its lower end, which latter engages the groove in a cam 22 which causes the valve to reciprocate at the right time to open or close the said port 9.

The valve plate 16 is provided with two ports 16a, one for controlling the admission of gas to the cylinder, and the other for controlling the exhausting of the gases of combustion.

An opening 16a, through the sliding plate 16, registers with openings through the cylinder and through the fixed plate along the line of the port 9, when the sliding plate is down, and moves away from and to a position above said other openings, when raised.

The said valve plate 16 may be made wide enough to cover ports of two or more cylinders and may be provided with two or more corresponding ports located at different levels, so that when a port in one cylinder is open the said valve plate covers and seals the corresponding port or ports in the other cylinder or cylinders, one valve plate thus serving to control ports in two or more cylinders.

The split metal piston ring 14 prevents the escape of gas around the movable sleeve 13, and the pressure of the compression spring 15 holds together the flange with the movable sleeve 13, the sliding plate 16, and the fixed plate or backing 17, preventing the escape of gas between the said flange and plates 16 and 17 respectively, so that the valve is sealed against the escape of gas, except when the opening through the sliding plate 16 registers with the said port 9. Another similar valve controls the intake on the other side of the motor.

As may be seen in Fig. 2, showing a side elevation of a motor equipped with my sliding valves, the opening through the sliding plate 16 registers with the port or opening 9 when the said sliding plate is down, thus opening the port, whereas the dotted position 23 shows the position of the opening in the valve plate when the plate is up, and the said port 9 is closed.

Figure 4:
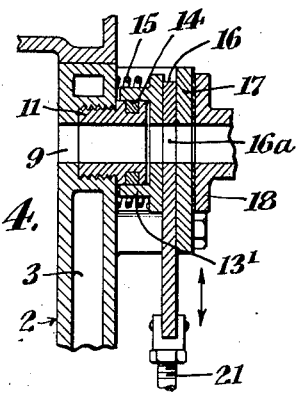
Fig. 4 is a view similar to Fig. 3, but showing some variation in the parts.

In the construction shown in Fig. 4, the head of the bushing 11, instead of being enlarged as at 12, in Figs. 1 and 3, carries, in an outer groove, the metal split ring 14 over which slides the movable sleeve 13¹, which, in this case, is formed more like a cap than in the said Figs. 1 and 3.

Fig. 5 illustrates another variation of my invention, in which the split ring 14 of Figs. 1 and 3 is replaced by a split ring sleeve, of metal, 24, which may be tapered at the ends to prevent any accumulation of carbon from interfering with the movement of the sleeve 13 to the smaller end of which it is adjacent. The spiral spring 15 is replaced by an annular crimped spring 25.

Fig. 6 shows still another species of my invention in that it omits the bushings 11 and 12 previously shown, the desired port being formed in the engine block itself, both the split ring 14, and the split sleeve 24 being used, the latter acting as an additional seal against the escape of gas and the influx of carbon around the movable sleeve 13.

The action of my split metal piston ring 14 and of the annular crimped spring 25 or the coil spring 26 in preventing the escape of gases or combustion during compression, explosion and passage on the one hand, and during intake of the new charge on the other, is exceedingly important and will be explained in connection with Fig. 7.

In the said Fig. 7 the split metal piston ring is mounted in the groove 14a in the bushing 14b, having the same relation to the bushing as do the grooves in the piston, as shown in Fig. 1. The split ring 14 has a very slight clearance in the groove, being moved alternately to one wall or the other of the groove, by the pressure of compression, combustion and explosion on its side toward the cylnder, or to the other wall of the groove by the atmospheric pressure of its other side, during the intake of the new charge which creates suction. That is, the ring tends to move from side to side of the groove away from the compression chamber during compression, and explosion, and passes towards the compression chamber during intake which latter creates suction. The position of the ring during intake is shown in Figs. 7 and 8. The clearances are greatly exaggerated in the drawings.

Also, in Fig. 7, there is an annular crimped spring mounted in a circular groove in the face of the cylinder surface which presses the flange 27 of the bushing 28 against the sliding valve plate 16, which valve plate is thereby pressed against the stationary backing plate 29. Thus, the annular crimped spring prevents the escape of gases or any substantial intake of oil, by pressing the flange sleeve 27 against the valve plate and the latter against the backing plate 29. And the compression forces the spring ring against the side of the groove which is nearest to the valve plate and shuts off any escape of gases between the said split ring and the said flange and during the compression or explosion of the gases within the cylinder. On the other hand, when the intake or suction begins, the pressure of the atmosphere outside the engine throws the split ring against the wall of the groove nearest the cylinder and thus prevents the drawing of air into the cylinder between the split ring and the wall of the groove nearest the cylinder, and the split ring itself prevents the drawing in of air or oil between the split ring and the cylindrical surface against which it presses in its effort to resume normal shape.

In Fig. 8, the annular crimped spring is replaced by a coil spring, which has the same effect as the annular crimped spring, while, at the same time, permitting the large air space which permits greater air cooling.

In addition to the aforesaid advantages of my sliding valve for motors, are the following:

My valve is non-carbonizing; that is, it could not be choked with carbon. Furthermore, it requires no "grinding in", as it does its own "wearing in" and polishing. Also the use is eliminated, of mushroom head valves which impede the intake and exhaust, the exhaust being free, full and unobstructed. The ports can be of any size, or shape, as may be most convenient. My valve has a relatively small area from which lubricating oil is wiped into the ports thereby largely avoiding contaminating the explosive mixture in the cylinder by the combustion of the heavy lubricating oil. There are no fluttering springs, but, on the contrary, the mechanism is actuated by positive mechanical parts. On the other hand, at high speeds, the springs used in the mushroom-head type of valve in common use, are said to flutter, thus interfering with the valve action and reducing power. Tappets, with their accompanying noise, which is particularly noticeable when out of adjustment, are eliminated. The power of the engine is increased. By elongating the ports at right angles to the movement of the reciprocating valve plate, the movement of the plate can be so limited as to reduce any wiping in of oil to a negligible quantity, thus avoiding the complication of grooves, pumps, etc.

I desire to call attention to the fact that in all of the forms of my invention which are illustrated herein, a split ring prevents the gases from reaching the spring which presses the plate 13 against the valve plate 16, by pressing its periphery on the side opposite the groove (usually its outer circumference) against the cylindrical surface which is opposed to it, and thus protecting the spring from the action of the hot gases and from the deposit of carbons, which spring may be either the annular crimped spring 25, or the spiral spring 15.

In other words, the split ring, in every case, being interposed between the port 9 and the crimped spring 25 or the coil spring 15, the gases of combustion could not reach either of the said springs and therefore could not impair their elasticity nor impede or prevent their action by the deposit of carbon. The groove 13a may be located either in the male or the female cylindrical surface.

My invention is susceptible of embodiment in many other forms than those illustrated. For instance, instead of having the valve plate directly attached to one of the rods 21, a number of plates can be carried by one shaft back and forth horizontally, in a frame thinner than said plates and holding them loosely, which would leave the said plates free to adjust themselves to the surfaces of their respective port connections.

By making the ports in the valve plates in the form of slots sufficiently long transversely, the stroke of the valve plate can be shortened in proportion, without reducing the area of the port.

I claim as my invention:

In a valve mechanism for internal combustion engines, the combination of a cylinder having a port therein, a moveable plate-valve supported by said cylinder and having a port therein, said cylinder having a surface fitting said plate-valve, a packing element moveable toward and from and fitting said plate-valve and having a port therein and a cylindrical hub on said packing element with a port therethrough, for which hub the said last mentioned moveable packing element forms a flange, the width of that portion of said flange over which the port of the said valve-plate slides being greater than the diameter of said last mentioned port, the said hub being located in a recess formed in the wall of the engine perpendicular to the axis of the said cylinder, said hub having an exterior annular groove, a split ring located in said groove and bearing against the inner surface of the said recess in said cylinder wall, and a spring directly pressing the said flange against the said plate-valve.

WINFIELD P. PORTER.